(12) United States Patent
Mishra et al.

(10) Patent No.: US 11,740,880 B2
(45) Date of Patent: Aug. 29, 2023

(54) PARTIAL DATA TYPE PROMOTION TO EXPLOIT EFFICIENT VECTORIZATION IN MICROPROCESSORS

(71) Applicant: International Business Machines Corporation, Armonk, NY (US)

(72) Inventors: Biplob Mishra, Bangalore (IN); Satish Kumar Sadasivam, Erode (IN); Puneeth A. H. Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/468,899

(22) Filed: Sep. 8, 2021

(65) Prior Publication Data

US 2023/0073063 A1    Mar. 9, 2023

(51) Int. Cl.
*G06F 8/40* (2018.01)
*G06F 8/41* (2018.01)

(52) U.S. Cl.
CPC .................... *G06F 8/427* (2013.01)

(58) Field of Classification Search
CPC . G06F 8/427; G06F 8/443; G06F 8/41; G06F 8/452; G06F 8/425; G06F 8/441; G06F 8/44432; G06F 8/4434; G06F 8/4441
See application file for complete search history.

(56) References Cited

U.S. PATENT DOCUMENTS

| | | | |
|---|---|---|---|
| 8,065,668 B2 | 11/2011 | Bosworth et al. | |
| 8,245,208 B2 | 8/2012 | Eichenberger et al. | |
| 9,075,630 B1 | 7/2015 | Smith et al. | |
| 10,423,733 B1 | 9/2019 | Venkataramani et al. | |
| 2014/0122832 A1* | 5/2014 | Ngai | G06F 8/433 712/7 |
| 2015/0268940 A1* | 9/2015 | Baghsorkhi | G06F 8/452 717/160 |
| 2019/0243625 A1* | 8/2019 | Sabne | G06F 8/4441 |
| 2019/0377690 A1 | 12/2019 | Anderson et al. | |

OTHER PUBLICATIONS

X. Tian et al., "Compiling C/C++ SIMD Extensions for Function and Loop Vectorizaion on Multicore-SIMD Processors," 2012 IEEE 26th International Parallel and Distributed Processing Symposium Workshops & PhD Forum, Shanghai, China, 2012, pp. 2349-2358. (Year: 2012).*
Guei-Yuan Lueh et al., "C-for-Metal: High Performance SIMD Programming on Intel GPUs" arXiv:2101.11049 [cs.DC], Jan. 26, 2021, 13 pages.

* cited by examiner

*Primary Examiner* — Hanh Thi-Minh Bui
(74) *Attorney, Agent, or Firm* — Cantor Colburn LLP; Teddi Maranzano (57) ABSTRACT

Aspects of the invention include a compiler detecting an expression in a loop that includes elements of mixed data types. The compiler then promotes elements of a sub-expression of the expression to a same intermediate data type. The compiler then calculates the sub-expression using the elements of the same intermediate data type.

16 Claims, 5 Drawing Sheets

FIG. 1

|            | 202                         | 204                        |
| ---------- | --------------------------- | -------------------------- |
| Data Type  |                             | Precedence                 |
| SMALLINT   |                             | SMALLINT, INTEGER, BIGINT  |
| INTEGER    |                             | INTEGER, BIGINT            |
| BIGINT     | 206                         | BIGINT                     |
| decimal    |                             | decimal, double            |
| double     |                             | double, DECFLOAT           |
| DECFLOAT   |                             | DECFLOAT                   |

```
302
        for ( int i = 0;   i < 4; i++ )
        {
304         a0 = (B[0] - C[0]) * ((B[4] - C[4]) << 16 );
            a1 = (B[1] - C[1]) * ((B[5] - C[5]) << 16 );
            a2 = (B[2] - C[2]) * ((B[6] - C[6]) << 16);
            a3 = (B[3] - C[3]) * ((B[7] - C[7]) << 16);
        }
```

PARTIAL DATA TYPE PROMOTION TO EXPLOIT EFFICIENT VECTORIZATION IN MICROPROCESSORS

BACKGROUND

The present invention generally relates to programmable computer systems, and more specifically, to programmable computer systems configured for partial data type promotion to exploit efficient vectorization in microprocessors.

A compiler is computer software that translates a high-level computer language of a source program into machine-language instructions. Once the compiler translates the source code into the machine-language instructions, a processor can execute the instructions as needed.

SUMMARY

Embodiments of the present invention are directed to a computer-implemented method for partial data promotion to exploit efficient vectorization in microprocessors. A non-limiting example of the computer-implemented method includes a compiler detecting an expression in a loop that includes elements of mixed data types. The compiler then promotes elements of a sub-expression of the expression to a same intermediate data type. The compiler then calculates the sub-expression using the elements of the same intermediate data type.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products configured for a compiler that is configured for analyzing a source code and detecting an expression for performing multiple calculations on mixed data type elements to reach a value. The compiler optimizes the compilation process by performing a partial data type promotion of some of the mixed data type elements. The optimizer then performs a partial calculation of the expression using the partially promoted data type elements. The compiler then performs a full data type promotion of all of the intermediate results as desired by the expression or the result as to maintain program accuracy.

Data type promotion is a process of converting an element having a data type in a smaller domain to having a data type in a larger domain to match the data type of another element. The data type in the smaller domain is a subset of the data type in the larger domain. Data type promotion can be performed by implicit conversion or explicit conversion. Implicit conversion does not require any special syntax or input from a user. Explicit conversion is performed based on a direction from a user or a function. Explicit conversion can be performed via manual user input or by casting an element from one data type in a smaller domain to another data type in a larger domain via an operator function.

Single Instruction Multiple Data (SIMD) is a description of an extension to a microprocessor that uses data type promotion to permit the microprocessor to perform parallel processing. SIMD permits multiple processing elements to work in parallel to execute the same instruction on each element contained in a register. In contemporary parallel processing systems, vector registers hold data elements as a single vector. For example, a register that is 128 bit wide can hold four 32-bit words as a single vector. A compiler prepares the source code to be stored on the vector register through a process of auto-vectorization. Source code can include expressions that have elements with multiple data types. To reconcile different data types within a single expression, contemporary compilers perform data type promotion on all elements having a smaller data type to a highest data type. When the compiler promotes each element to the highest data type, the compiler limits the number of elements that can be stored in a register. This limits the number of calculations a processor can perform and increases the number of clock cycles needed to execute a code.

One or more embodiments of the present invention address one or more of the above-described shortcomings by providing computer-implemented methods, computing systems, and computer program products for a compiler that enables a register to hold more elements during the compilation process. The herein described compiler can detect vectorizable loops in a source code. The compiler further detects loop expressions that rely on multiple calculations to calculate a value. The compiler determines which of the calculations can be performed with partial data promotion, rather than full data promotion. In other words, calculations can be performed using elements that have not been promoted to a highest data type. The compiler then performs an intermediary step of partial data type promotion and performs the calculation using the partially promoted elements.

For example, if a compiler promoted four elements to 32-bit data types, a 64-bit register could only hold two elements at a time. If, however, a compiler partially promoted the four elements to 16-bit data types, the 64-bit register could hold all four elements at a time. This permits the processor to perform a greater number of calculations and speeds up the execution process.

The herein described methodology for partial promotion further improves the optimization capabilities in a compiler as it no longer needs to convert the smaller data type to the largest data type in the expression at the very start and hence enables the compiler to rearrange operations to enable more computations on a smaller/intermediate data type, improve vectorization cost model, and in turn improve vectorization performance.

One or more embodiments of the present invention describes the technique of partial data promotion to be more generic and iterative. In a given compute expression which includes elements of different data type and sizes, the compiler further detects and groups expressions in execution order, further computes a sub-expression by partially promoting the data type of the elements within the sub-expression, and computes the full expression by iteratively promoting the elements based upon the requirements of the expression.

Figure 1:
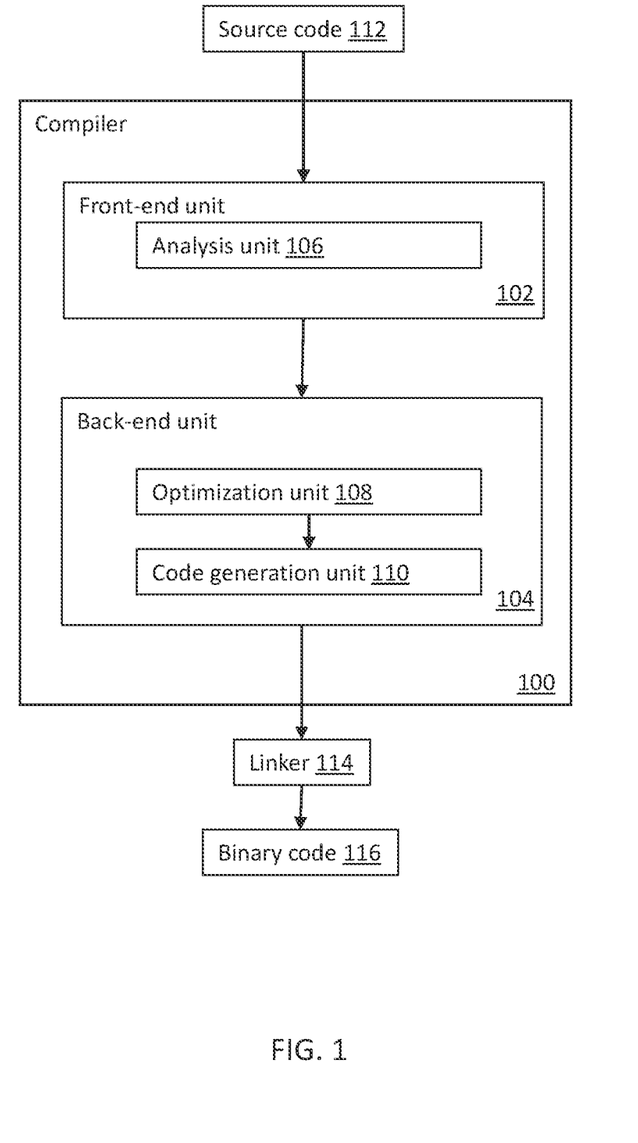
FIG. 1 illustrates a compiler configured for partial data promotion according to one or more embodiments of the present invention.
Figure 5:
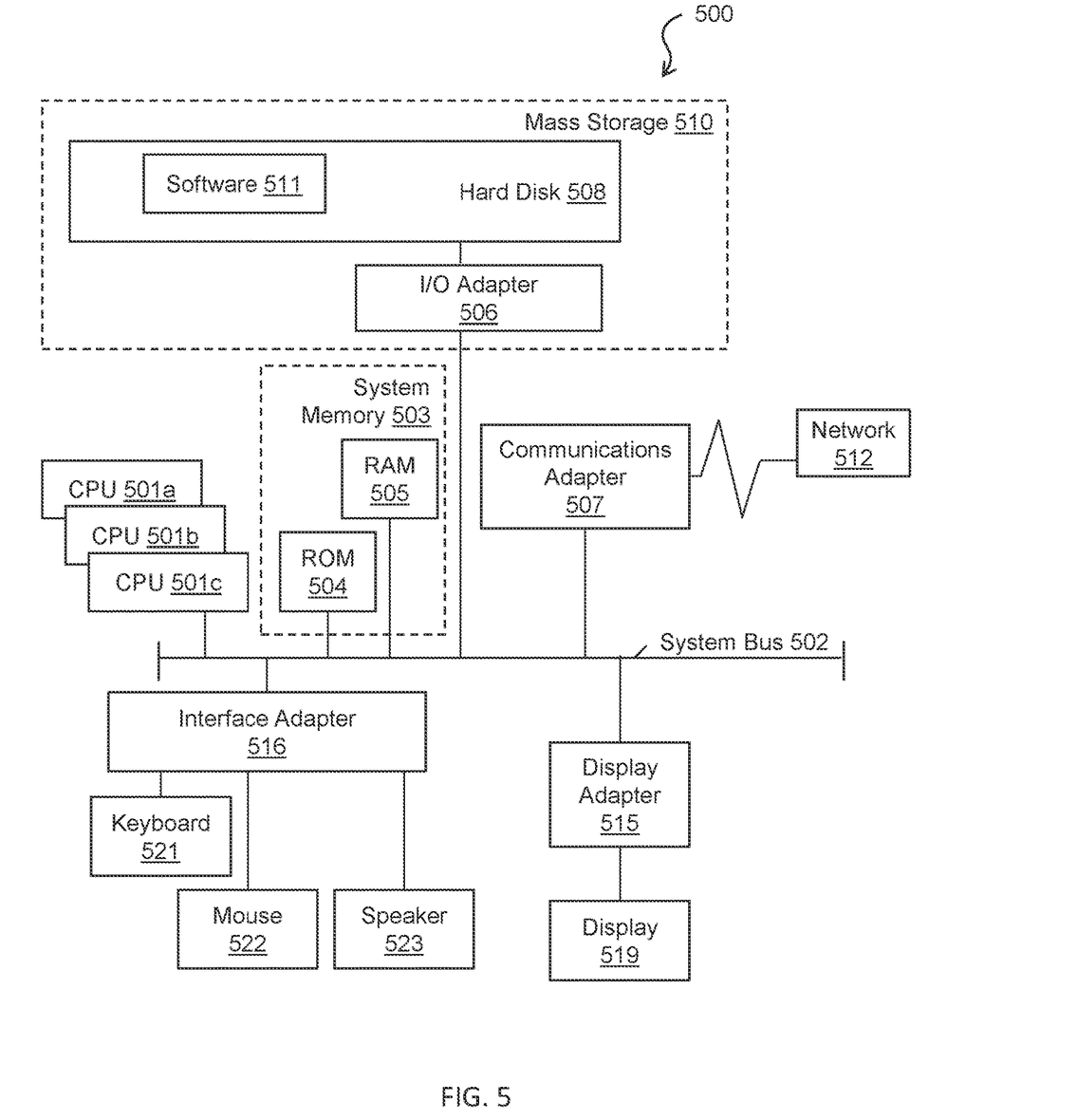
FIG. 5 illustrates a block diagram of a computer system for use in implementing one or more embodiments of the present invention.

Referring to FIG. 1, a compiler 100 configured for partial data promotion is shown in accordance with one or more embodiments of the present invention. The compiler 100 generally includes software for receiving a code written in a higher-level programing language (e.g., Java) and translating the code into object code (e.g., binary format, assembly language). The compiler 100 includes a front-end unit 102 for analyzing the source code 112 and outputting an intermediate representation of source code 112. The compiler 100 further includes and back-end unit 104 that includes an optimization unit 108 for performing the partial data type promotion and a code generation unit for generating the binary code 116. Object code includes a set of instructions written in machine-language for guiding a particular aspect of a software or hardware function. In some embodiments of the present invention, the compiler 100 is in communication with a linker 114 that receives object code files and combines the files into a single executable file of binary code 116. It should be appreciated that the compiler 100 and linker 114 as illustrated in FIG. 1 can be implemented in the computer system 500 as illustrated in FIG. 5.

The front-end unit 102 includes an analysis unit 106 for receiving and processing the source code 112. As the source code 112 can be written in multiple higher-level programming languages, the front-end unit 102 can include multiple instances of the analysis unit 106 for respective programming languages. The analysis unit 108 is operable to receive the source code 112 and preliminarily check the code for lexical, grammatical, and syntax errors. In the event that the analysis unit 108 detects an error, it can suspend further analysis of the source code 112 and report the error. Upon analyzing the code, the analysis unit 106 further outputs an intermediate representation of the source code 112. The intermediate representation includes one or more data structures that represent the semantic content of the source code 112. The intermediate representation not only preserves the semantic and syntactic characteristics of the source code, but also includes annotations for the back-end unit 104. The annotations can include descriptions of relationships between different segments of the source code. The annotation can further include instructions for optimizing the object code 116. The annotations are used by the back-end unit 104 to optimize converting the intermediate representation into object code 116, and to dictate how the back-end unit 104 can write the object code.

The optimization unit 108 receives the intermediate representation from the front-end unit 102 and analyzes the intermediate representation to detect any vectorizable loops. A loop is a block of code that repeats over a set number of times (e.g., a for loop or a while loop). Vectorizing a loop is a process of rewriting a code such that instead of a processor executing an instruction to process a single element N number of times, the processor can simultaneously execute multiple instances of the instruction to process multiple different elements.

The optimization unit 108 detects one or more vectorizable loops through analysis of the intermediate representation. In general vectorizable loops share some common criteria, and the optimization unit 108 can use various methods (e.g., control flow graph) to detect these characteristics. For example, the number of loops needs to be ascertainable prior to execution for a loop to be vectorizable. Although the number of loops does not need to be known prior to the compilation process, the numbers of loops need to be ascertainable before a processor executes the loop. Additionally, the loop should have a single control flow to be vectorizable. Therefore, if the optimization unit 108 detects conditional statements or branching statements within the loop, the loop does not have a single control flow and may not be vectorizable. The loop should not include any function calls. Therefore, if the optimization unit 108 detects a function call, the loop may not be vectorizable.

Once the optimization unit 108 has detected the vectorizable loops, it can calculate a cost for a vectorized loop and the loop in its original scalar form. The optimization unit 108 can then compare the cost of vectorization to the cost of keeping the loops in their original scalar form. The vectorized loop cost is the cost of one iteration of the vectorized loop. The scalar loop cost is the cost of one iteration of the scalar loop. For example, the optimization unit 108 can compare the number of clocks cycles needed to execute one iteration of the vectorized loop and the number of clocks cycles needed to execute one iteration of the scalar loop. The optimization unit 108 can compare the difference in clock cycles to a threshold difference and determine whether vectorization is optimal. If vectorization is not optimal, the optimization unit 108 leaves the loop in a scalar form. If vectorization is optimal, the optimization unit 108 rewrites the loop code to vectorize the code.

The optimization unit 108 further analyzes the rewritten vectorized loop code to detect any expression that uses mixed data types for calculation. For example, an expression may call for elements to perform a computation, in which a sub-expression of the expression maybe computed by elements of a smaller data type (e.g., "CHAR") and other parts of the expression may need elements of larger data type (e.g., "INT"). Upon detecting an expression with the mixed data types, the optimization unit 108 evaluates the expression to determine whether one or more of the elements can be promoted to an intermediate data type. For example, suppose an expression called for (A+B)C=X and A is 8-bit smallest element type element, B is an intermediate 16-bit data type element, and C is a 32-bit highest data type element. A conventional compiler would promote A and B to 32-bit data type elements. The optimization unit 108 rather determines whether elements of the sub-expression A+B can be promoted to the same 16-bit data type. If A can be promoted to an intermediate 16-bit data type and (A+B)C would still result in a computationally correct X value, the optimization unit 108 partially promotes A to the intermediate 16-bit data type. If A can be promoted to the intermediate 16-bit data element, but (A+B)C would not result in a computationally correct X value, the optimization unit 108 promotes elements A and B to 32-bit data types. If the optimization unit 108 elected to engage in partial promotion, the sub-expression A+B is calculated with 16-bit data type, which allows for improved vectorization capabilities. The optimization unit 108 then promotes the result of A+B to a 32-bit data type to proceed further in the expression and maintain result correctness.

In some embodiments of the present invention, the optimization unit 108 analyzes the expression to detect each sub-expression and determine whether any sub-expressions can be manipulated (e.g., rearranged) to permit more calculations using partially promoted elements and maintain result correctness. The available manipulations are expression-specific and must lead to result correctness. In some embodiments of the present invention, the optimization unit 108 can access a table of permissible expression manipulations. For example, an expression includes ((A+B)+C)D, in expression specific instances, the optimization unit 108 can determine that (A+B)+C can be rearranged to (A+B+C). If the optimization unit 108 determines that any sub-expression can be manipulated to enable more calculations, the optimization unit 108, then calculates a vector cost for manipulating the expression. The optimization unit 108 then compares the vector cost (e.g., clock cycles) to a cost (e.g., clock cycles) of not manipulating the expression. If manipulating the sub-expression is optimal based on the comparison, the optimization unit 108 then performs partial promotion of the elements of the manipulated sub-expression to an intermediate date type. The optimization unit 108 then calculates the result of the manipulated sub-expression. Upon calculating the expression, the optimization unit 108 redetermines whether any other part of the expression can be manipulated to permit more calculations using partially promoted elements and maintain result correctness. For example, the optimization unit 108 replaces the manipulated sub-expression with the result in the expression, and reevaluates the expression for potential manipulation. The reevaluation can be iteratively performed after calculating a result for each manipulated sub-expression.

Upon performing the partial promotion, the optimization unit 108 can determine whether a vectorized loop using partially promoted elements is optimal. The optimization unit 108 can calculate a cost for a vectorized loop with partial promotion and a vectorized loop with full promotion. The optimization unit 108 can then compare the cost for a vectorized loop with partial promotion to the cost of the vectorized loop with full promotion. For example, the optimization unit 108 can compare the number of clocks cycles needed to execute one iteration of the vectorized loop with partial promotion and the number of clocks cycles needed to execute one iteration of the vectorized loop with full promotion. The optimization unit 108 can compare the difference in clock cycles to a threshold difference and determine whether vectorization with partial promotion is optimal. If vectorization is optimal, the optimization unit 108 generates the vectorized loop with partially promoted data types. If vectorization is not optimal, the optimization unit 108 generates the vectorized loop with fully promoted data types. It should be appreciated that the optimization unit 108 evaluates each loop in source code 112 independently. Therefore, the optimization unit 18 may choose to perform partial promotion as to one loop and perform full promotion as to another loop.

In some embodiments of the present invention, the optimization unit 108 calculate a cost for a vectorized loop with partial promotion as to each sub-expression. In other words, the optimization unit 108 can calculate the cost of performing partial promotion as to individual sub-expressions. The optimization unit 108 iteratively traverses each sub-expression and determines the cost. The optimization unit 108 can then compare the cost for a vectorized loop with partial promotion for the sub-expression to the cost of the vectorized loop with full promotion of the sub-expression. In this sense, the optimization unit 108 can select some of the sub-expressions for partial promotion, if partially promoting all of the sub-expressions is not optimal. For example, the optimization unit 108 can compare the number of clocks cycles needed to execute one iteration of the vectorized loop with partial promotion of a sub-expression and the number of clocks cycles needed to execute one iteration of the vectorized loop with full promotion of the sub-expression. The optimization unit 108 can compare the difference in clock cycles to a threshold difference and determine whether vectorization with partial promotion of the sub-expression is optimal.

Figure 2:
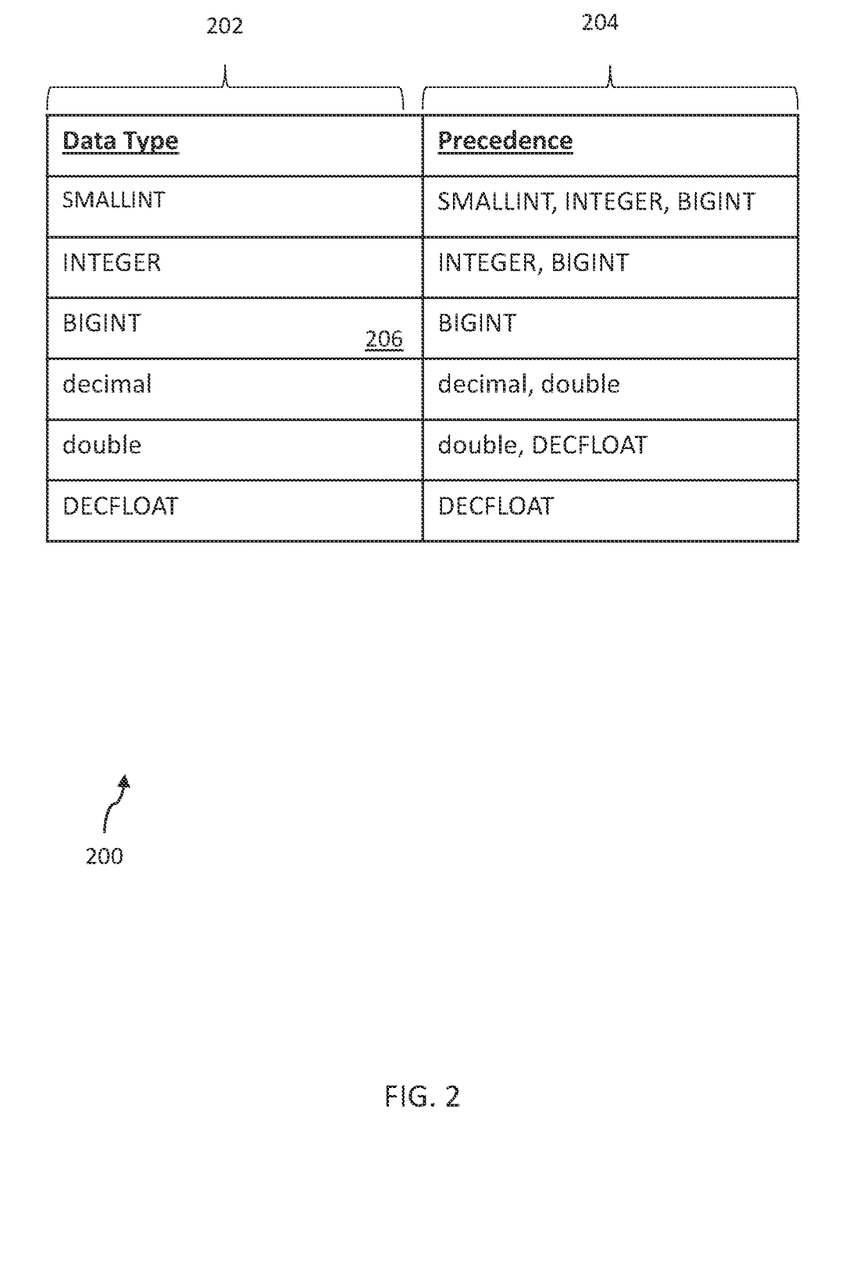
FIG. 2 illustrates a data type precedence table according to one or more embodiments of the present invention.

Referring to FIG. 2, a precedence table 200 according to embodiments of the present invention. The precedence table includes a data type column 202 and a data type precedence column 204. The data type column 202 is a list of different data types. The data type precedence column 204 includes the data types that a data type can be promoted. For example, an INTEGER datatype 206 can be promoted to itself (INTEGER) and BIGINT. It should be appreciated that different computing languages can have different precedence orders. For example, a precedence table for code written in C may not be the same as a precedence table for code written in another language.

Figure 3:
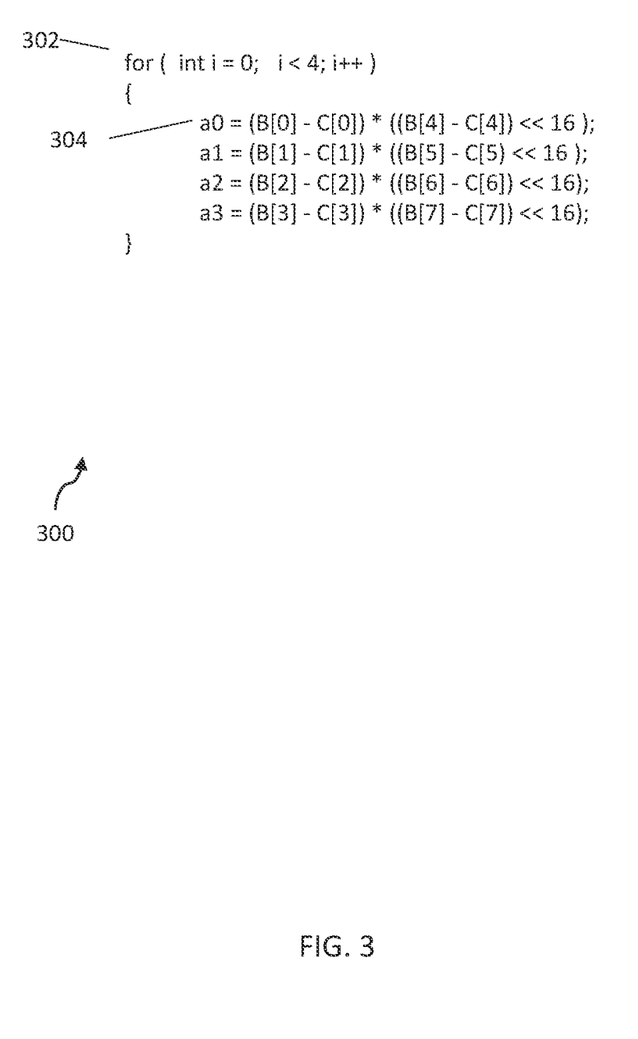
FIG. 3 illustrates an exemplary source code according to one or more embodiments of the present invention.

Referring to FIG. 3, an exemplary illustration of an optimizer of a compiler for an application is shown in accordance with one or more embodiments of the present invention. In practice, compilers use optimization to speed up computations. A source code 300 that includes a for loop 302 with four expressions to respectively calculate values for a0, a1, a2, and a3 is shown. As seen the loop 302 includes the following expression 304 to solve for a0, (B[0]−C[0])*((B[4]−B[4])<<16). Each of the expressions to calculate a1, a2, and a3 are the same, however, each expression uses a different data value from an eight element ([0]-[7]) array as its arguments. In this expression 304, multiple calculations are performed to calculate a0: step (1) B[0] is added to C[0]; step (2) C[4] is subtracted from B[4] and the resulting value is shifted sixteen bits to left; and step (3) the result of step (1) is multiplied with the result of step (2) to calculate a0.

Each of the elements [0]-[7] are unsigned character data types that each consume 8 bits of memory. The right side of the expression 304, ((B[4]−C[4])<<16), calls for the result of subtracting C[4] from B[4] to be shifted 16 spaces to the left. The result of subtracting C[4] from B[4] is an 8-bit value and shifting the 8-bit data type by sixteen bits to the left, results in a 24-bit data type (16+8). However, there is no 24-bit data type, and therefore a conventional compiler would shift the element an additional eight bits to a 32-bit data type prior to performing calculations.

A conventional compiler would read the expression for calculating a0 and convert all the elements, [0]—[7] from 8-bit data types to 32-bit data types (e.g., via a zero extension), and then begin performing the calculations. For example, if B[0]=10 and C[0]=20, the result of B[0]−B[0] is a negative number. Or, if, B[0]=20 and C[0]=10, the result of B[0]−C[0] is a positive number. However, if, the conventional compiler had a 128-bit register and vectorized each of the eight elements [0]-[7] to 32-bit data types, the register only holds four out of the eight elements [0]-[7] at a time. This further leads to a suboptimal machine code as described below:

1. Load 4 elements B[0], B[1], B[2], B[3]
2. Load 4 elements C[0], C[1], C[2], C[3]
3. Load 4 elements B[4], B[5], B[6], B[7]
4. Load 4 elements C[4], C[5], C[6], C[7]
5. 4 Permutes to convert above 4 loads from uint8_t to uint32_t
6. 2 subtracts.

Alternatively, if the compiler attempts to calculate a result for a0 using the original 8-bit data type, and then promoting the result into a 32-bit data type by sign extension, the result is an incorrect calculation for a0.

Therefore, embodiments of the present invention, include an optimization unit 108, that performs a partial promotion to convert the eight elements from 8-bit data types to intermediate 16-bit data types. Therefore, a 128-bit vectorizer can hold eight sixteen bit elements in a single register at any given time and perform a computationally correct calculation. The further leads to mode optimal machine code as follows:

1. Load 8 elements B[0], B[1] . . . B[7]
2. Load 8 elements C[0], C[1] . . . C[7]
3. 2 permutes to convert above 2 loads to uint16_t
4. 1 subtract
5. 2 permutes to convert a single vector uint16_t to 2 vectors of uint32_t.

The resulting machine code saves two loads to the register and 1 subtract per vectorized loop iteration.

Figure 4:
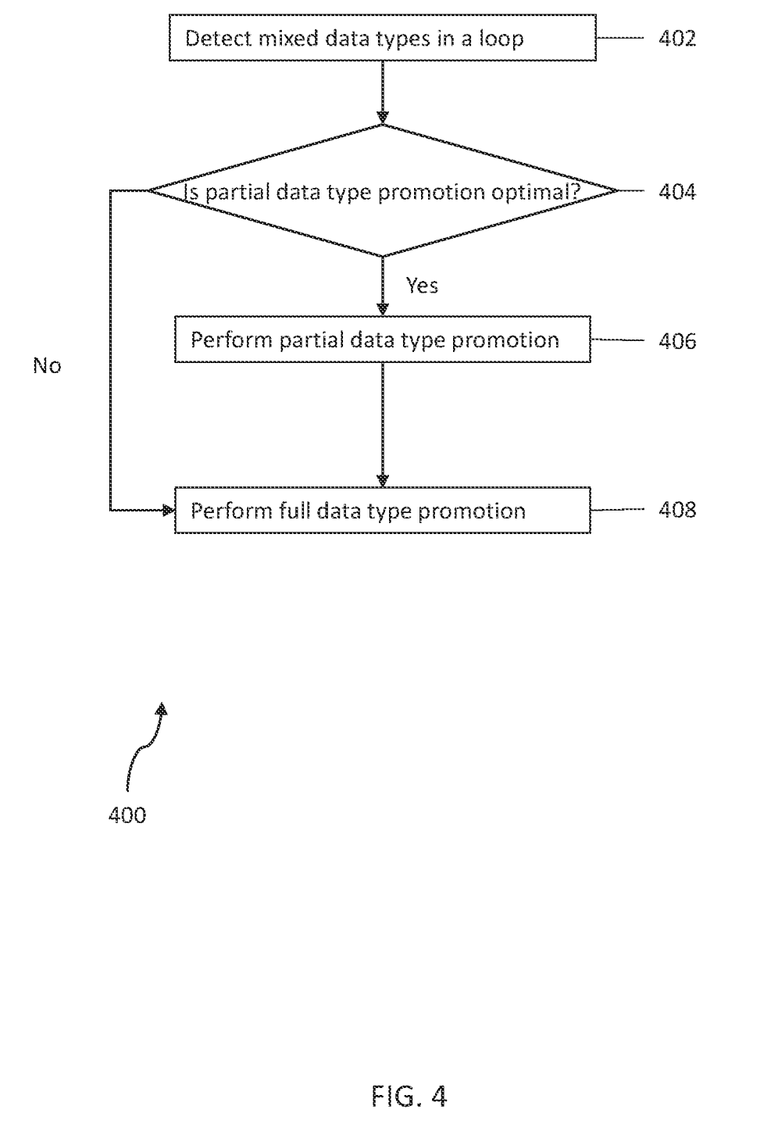
FIG. 4 illustrates a process flow for a compiler to perform partial data promotion according to one or more embodiments of the present invention.

Referring to FIG. 4, a process flow 400 for performing a partial data type promotion in accordance with one or more embodiments of the present invention is shown. It should be appreciated that the steps described in FIG. 4 can be performed by the compiler 100 illustrated in FIG. 1 and the computer system 500 illustrated in FIG. 5. At block 402, an optimization unit 108 of a compiler 100 analyzes a source code 112 and detects a vectorized loop that includes an expression with mixed data type usage. In some embodiments of the present invention, the optimization unit 108 checks each element that an expression calls for and determines whether the elements each have a same data type or do the elements have mixed data types. The optimization unit 108 further determines whether an expression call for an element to be converted from one data type to another data type.

At block 404, the optimization unit 108 determines whether a partial data type promotion is optimal. The optimization unit 108 can calculate a cost for a vectorized loop with partial promotion versus a cost of a vectorized loop with full promotion. For example, the optimization unit 108 can compare a projected number of clocks cycles needed to execute one iteration of the vectorized loop with partial promotion and a projected number of clocks cycles needed to execute one iteration of the vectorized loop with full promotion. The optimization unit 108 can compare the difference in clock cycles to a threshold difference and determine whether vectorization is optimal.

If vectorization with partial promotion is optimal, the optimization unit 108 proceeds to block 406 and generates a vectorized loop with partial promotion using intermediate data types. If vectorization is not optimal, the optimization unit 108 proceeds to block 408 and generates the vectorized loop with full promotion using the highest data types. Upon completion of performing any calculations using the partially promoted elements, the optimization performs a full promotion of the elements to the highest data type and completes the calculations of the expression at block 408.

In one or more embodiments of the present invention, the hardware/software modules in the compiler from FIG. 1 can be implemented on the computer system 500 found in FIG. 5. Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting, by a compiler, an expression in a loop that includes elements of mixed data types;
    promoting, by the compiler, elements of a sub-expression of the expression to a same intermediate data type;
    calculating, by the compiler, the sub-expression using the elements of the same intermediate data type,
    promoting a result of the calculation of the sub-expression to a highest data type of remaining elements of the expression, wherein the highest data type is greater than the same intermediate data type;
    identifying a sub-expression as a candidate for promotion of the elements to the same intermediate data type;
    calculating a vector cost of the promotion of the elements to the same intermediate type;
    comparing the vector cost to a vector cost of promotion of the elements to a highest type; and
    determining whether to promote the elements of a sub-expression of the expression to the same intermediate data type based on the comparison.

2. The computer-implemented method of claim 1, wherein the method further comprises completing calculation of the expression using the result of the calculation.

3. The computer-implemented method of claim 1, wherein the method further comprises rearranging the expression to increase a number of calculations performable via partially promoted elements.

4. The computer-implemented method of claim 1, wherein the method further comprises determining whether promotion of mixed data types to have the same intermediate data type is optimal.

5. The computer-implemented method of claim 1, whether the method further comprises:
    determining whether the loop is vectorizable; and
    vectorizing the loop from a scalar from to a vectorized form, such that a processor can simultaneously execute multiple instances of the expression to process multiple different elements.

6. The computer-implemented method of claim 1, wherein the elements of a sub-expression consist of a subset of the elements of the expression.

7. A system comprising:
    a memory having computer readable instructions; and
    one or more processors for executing the computer readable instructions, the computer readable instructions controlling the one or more processors to perform operations comprising:
    detecting an expression in a loop that includes elements of mixed data types;
    promoting elements of a sub-expression of the expression to a same intermediate data type;
    calculating the sub-expression using the elements of the same intermediate data type,
    promoting a result of the calculation of the sub-expression to a highest data type of remaining elements of the expression, wherein the highest data type is greater than the same intermediate data type;
    identifying a sub-expression as a candidate for promotion of the elements to the same intermediate data type;
    calculating a vector cost of the promotion of the elements to the same intermediate type;
    comparing the vector cost to a vector cost of promotion of the elements to a highest type; and
    determining whether to promote the elements of a sub-expression of the expression to the same intermediate data type based on the comparison.

8. The system of claim 7, wherein the operations further comprise completing calculation of the expression using the result of the calculation.

9. The system of claim 7, wherein the operations further comprise rearranging the expression to increase a number of calculations performable via partially promoted elements.

10. The system of claim 7, wherein the operations further comprise determining whether promotion of mixed data types to have the same intermediate data type is optimal.

11. The system of claim 7, wherein the operations further comprise:
    determining whether the loop is vectorizable; and
    vectorizing the loop from a scalar from to a vectorized form, such that a processor can simultaneously execute multiple instances of the expression to process multiple different elements.

12. A computer program product comprising a computer readable storage medium having program instructions embodied therewith, the program instructions executable by a processor to cause the processor to perform operations comprising:
    detecting an expression in a loop that includes elements of mixed data types;
    promoting elements of a sub-expression of the expression to a same intermediate data type;
    calculating the sub-expression using the elements of the same intermediate data type,
    promoting a result of the calculation of the sub-expression to a highest data type of remaining elements of the expression, wherein the highest data type is greater than the same intermediate data type;

identifying a sub-expression as a candidate for promotion of the elements to the same intermediate data type;

calculating a vector cost of the promotion of the elements to the same intermediate type;

comparing the vector cost to a vector cost of promotion of the elements to a highest type; and determining whether to promote the elements of a sub-expression of the expression to the same intermediate data type based on the comparison.

13. The computer program product of claim 12, wherein the operations further comprise completing calculation of the expression using the result of the calculation.

14. The computer program product of claim 12, wherein the operations further comprise rearranging the expression to increase a number of calculations performable via partially promoted elements.

15. The computer program product of claim 12, wherein the operations further comprise determining whether promotion of mixed data types to have the same intermediate data type is optimal.

16. The computer program product of claim 12, wherein the operations further comprise:

determining whether the loop is vectorizable; and vectorizing the loop from a scalar from to a vectorized form, such that a processor can simultaneously execute multiple instances of the expression to process multiple different elements.

\* \* \* \* \*